United States Patent

Farr

[11] Patent Number: 5,180,212
[45] Date of Patent: Jan. 19, 1993

[54] DUAL BRAKE PRESSURE REDUCING VALVE ASSEMBLY USING SINGLE INERTIA RESPONSIVE MEMBER

[75] Inventor: Glyn P. R. Farr, Leek Wootton, United Kingdom

[73] Assignee: Lucas Industries Public Limited Company, Birmingham, England

[21] Appl. No.: 682,077

[22] Filed: Apr. 9, 1991

[51] Int. Cl.⁵ .............................................. B60T 8/28
[52] U.S. Cl. .................................. 303/9.68; 303/24.1
[58] Field of Search ................... 303/9.67, 9.68, 9.62, 303/9.63, 24.1

[56] References Cited

U.S. PATENT DOCUMENTS

| | | | |
|---|---|---|---|
| 3,727,987 | 4/1973 | Shellhause | 303/9.67 |
| 4,050,744 | 9/1977 | Nogami | 303/9.68 |
| 4,736,989 | 4/1988 | Myers et al. | 303/24.1 X |

FOREIGN PATENT DOCUMENTS

| | | | |
|---|---|---|---|
| 77790 | 8/1976 | Australia | 303/9.68 |
| 2703851 | 1/1978 | Fed. Rep. of Germany | 303/9.68 |
| 8476 | 1/1978 | Japan | 303/9.68 |
| 37279 | 4/1978 | Japan | 303/24.1 |
| 1097080 | 10/1982 | United Kingdom | 303/9.68 |

WO90/13462 11/1990 World Int. Prop. O.

*Primary Examiner*—Robert J. Oberleitner
*Assistant Examiner*—Alfred Muratori
*Attorney, Agent, or Firm*—Jacobson, Price, Holman & Stern

[57] ABSTRACT

A brake pressure reducing valve assembly (1) includes first (2) and second (3) normally open valve sets each for controlling communication between respective associated inlet (4A,15) and outlet (4,16) chambers. The first valve set (2) is controlled by a brake pressure responsive piston (6) and a deceleration responsive member (7). The second valve set (3) is controlled by a pressure responsive piston (14). The respective pressure responsive pistons (6,14) are biased apart by a common compression spring (9). In use, the force applied to the piston (14) of the second valve set (3) by the spring (9) is determined by the position of the piston (6) of the first valve set (2) relative to the valve body. Accordingly the pressures at the outlet chambers (4,16) are maintained equal. The valve provides deceleration responsive brake pressure reduction to the rear brakes of a dual braking system without the need for two separate deceleration responsive members.

14 Claims, 3 Drawing Sheets

DUAL BRAKE PRESSURE REDUCING VALVE ASSEMBLY USING SINGLE INERTIA RESPONSIVE MEMBER

BACKGROUND OF THE INVENTION

This invention relates to a brake pressure reducing valve assembly for use in a vehicle braking system to supply, under certain braking conditions, a brake pressure to the rear brake actuators of the vehicle which is lower than the brake pressure supplied to the front brake actuators.

It is well recognized that it is a desirable characteristic for a vehicle braking system for the rear brake pressure to rise at the same rate as the front brake pressure as the brakes are applied until a certain threshold pressure (referred to as the cut-in pressure) is reached, and thereafter for the rear brake pressure to rise more slowly than the front brake pressure as the brakes are further applied. This desirable result can be achieved by interposing one or more pressure reducing valves into the brake supply line to the rear brakes.

Various embodiments of brake pressure reducing valve assembly are described in our co-pending International patent application No. PCT/GB90/00707, publication No. WO 90/13462 entitled "Brake Pressure Reducing Valve Assembly" incorporated herein by reference. The brake pressure reducing valve assemblies described in this application are particularly suitable for braking systems in which a single fluid pressure supply line is used to supply brake pressure to all the actuators of the rear brakes of a vehicle. Under these circumstances, any of the illustrated brake pressure reducing valves may be inserted into the rear brake pressure line to produce the desired control of rear brake pressure.

In the case of vehicles having two separate pressure lines which supply fluid to rear actuators, for example vehicles having so-called "X-Split" braking systems, two brake pressure reducing valves of the type described in WO 90/13462 would be required—one such valve assembly being inserted in each pressure line to the rear brakes. Such an arrangement would not be ideal because variations in manufacturing tolerance and the degree of wear between the brake pressure reducing valves could result in different brake pressures being supplied to the respective rear braking circuits. Further, each brake pressure reducing valve absorbs a certain volume of pressurized working fluid if the vehicle is laden and the brake system pressure rises above the driver only cut-in pressure. If two separate valves are used, this could result in an excessive requirement for pressurized working fluid.

BRIEF SUMMARY OF THE INVENTION

The objective of the present invention is to provide a brake pressure reducing valve assembly for a vehicle having two rear brake circuits in which the advantages of the brake pressure reducing valves described in WO 90/13462 are preserved, and yet in which a substantially equal pressure is supplied to both rear braking circuits in normal use. The preferred embodiments of the invention also obviate the problem of excessive fluid absorption outlined above.

According to one aspect of the present invention a brake pressure reducing valve assembly comprises first and second normally open valve sets each for controlling communication between respective associated inlet and outlet chambers, the first valve set being controlled by the combination of a brake pressure responsive piston and a deceleration responsive member, and the second valve set being controlled by a brake pressure responsive piston, wherein the pistons move towards each other to effect closure of their respective valve sets, and wherein the pistons are biased away from each other by a common compression spring whereby the force required to move the second piston in the closing direction against the bias of the spring is determined by the position of the first piston.

The preferred embodiments of the present invention allow a single deceleration responsive member and associated pressure responsive piston to control the first valve set, and utilize the position of that piston both at the moment of closure of the first valve set and subsequently to control closure of the second valve set whereby substantially constant pressures exist in both outlet chambers.

BRIEF DESCRIPTION OF THE DRAWINGS

The invention will be better understood from the following description of preferred embodiments thereof, given by way of example only, reference being made to the accompanying drawings wherein.

DETAILED DESCRIPTION

Figure 1:
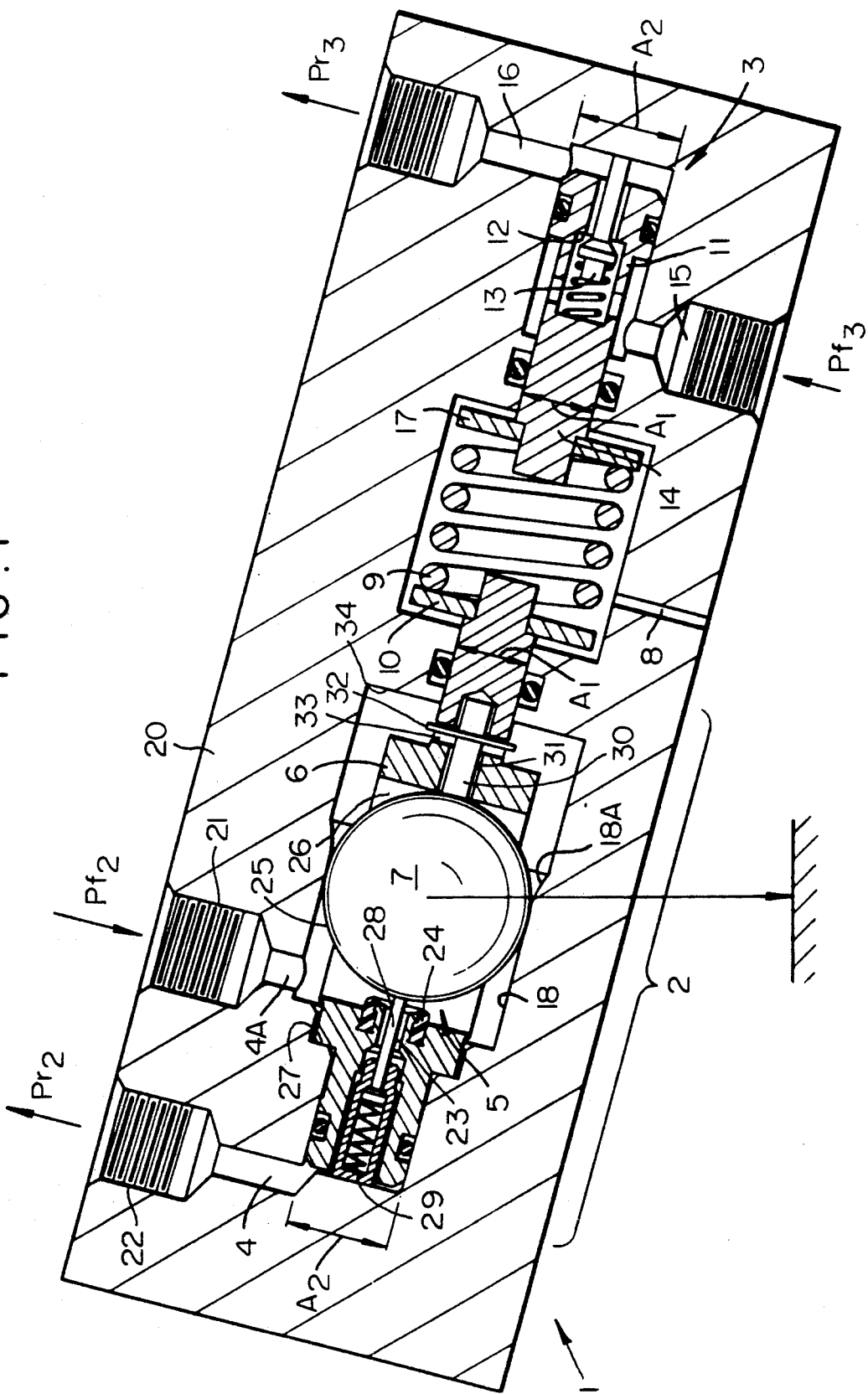
FIGS. 1 and 2 are axial cross-sectional views which illustrate schematically respective embodiments of the invention.

Referring firstly to FIG. 1 the illustrated brake pressure reducing valve assembly 1 comprises a brake pressure and deceleration responsive pressure reducing valve 2 and a brake pressure responsive brake pressure reducing valve 3. The pressure reducing valve 2 corresponds to that illustrated in FIG. 9 of the above referred to WO 90/13462 incorporated herein by reference for a full description of the structure and operation of the valve 2. A corresponding description is presented below, but summarily valve 2 has an inlet chamber 4A, an outlet chamber 4, and a valve set 5 for controlling communication between the inlet and the outlet chambers. The valve set is controlled by a combination of a pressure responsive piston 6 and a deceleration responsive ball 7. The piston 6 has an area $A_1$ which is exposed to atmospheric pressure via a vent passage 8 and an area $A_2$ (larger than $A_1$) which is exposed to the pressure prevailing in the outlet chamber 4. The piston 6 is biased to the left as viewed in the drawing by a compression spring 9 which acts on the piston via a washer 10.

More specifically, reducing valve 2 comprises a valve body 20 in which is defined an inlet chamber 4A and an outlet chamber 4. The inlet chamber 4A is connectable by way of an inlet fitting (not shown) in inlet 21 to a source of brake actuating fluid, for example a hydraulic master cylinder, and the outlet chamber 4 is connected by way of an outlet fitting (not shown) in outlet 22 to a brake actuator. A piston 6 is slidably mounted in the valve body and has a relatively large area $A_2$ exposed to the outlet chamber 4 and a relatively small area $A_1$ exposed to atmosphere via a vent passage 8 formed in the valve body. An annular zone representing the difference between $A_2$ and $A_1$ is exposed to the working pressure in the inlet chamber 4A.

Piston 6 is biased towards outlet chamber 4 by a spring 9 and includes an axially extending passage 23 which connects the inlet chamber 4A to the outlet chamber 4. One end of passage 23 forms a valve seat 24 which can be engaged by the surface 25 of a ball 7 which is located within a cage-like central portion 26 of piston 6. In the normal, illustrated, configuration of the components piston 6 is biased into contact with a shoulder 27 of the valve body by spring 9, and ball 7 is held away from seat 24 by gravity and by a spring loaded plunger 28 urged by a spring assembly 29 between plunger 28 and the valve body.

In use, passage 23 provides a free communication between inlet 21 and outlet 22 until the pressure within the valve body rises to a level which, acting over area $A_1$, is able to overcome the force of spring 9 and move piston 6 to the right.

In the driver only case, i.e. where only the driver occupies the vehicle, the brake pressure necessary to move piston 6 against the force of spring 9 will produce a deceleration sufficient to bias ball 7 to the left as piston 6 moves towards the right. Accordingly, in the driver only case the ball will remain in contact with plunger 28 as piston 6 moves to the right, and after the piston is moved by the normal clearance distance between surface 25 and seat 24, seat 24 will engage surface 25 and communication from inlet 21 to outlet 22 will be interrupted.

Figure 3:
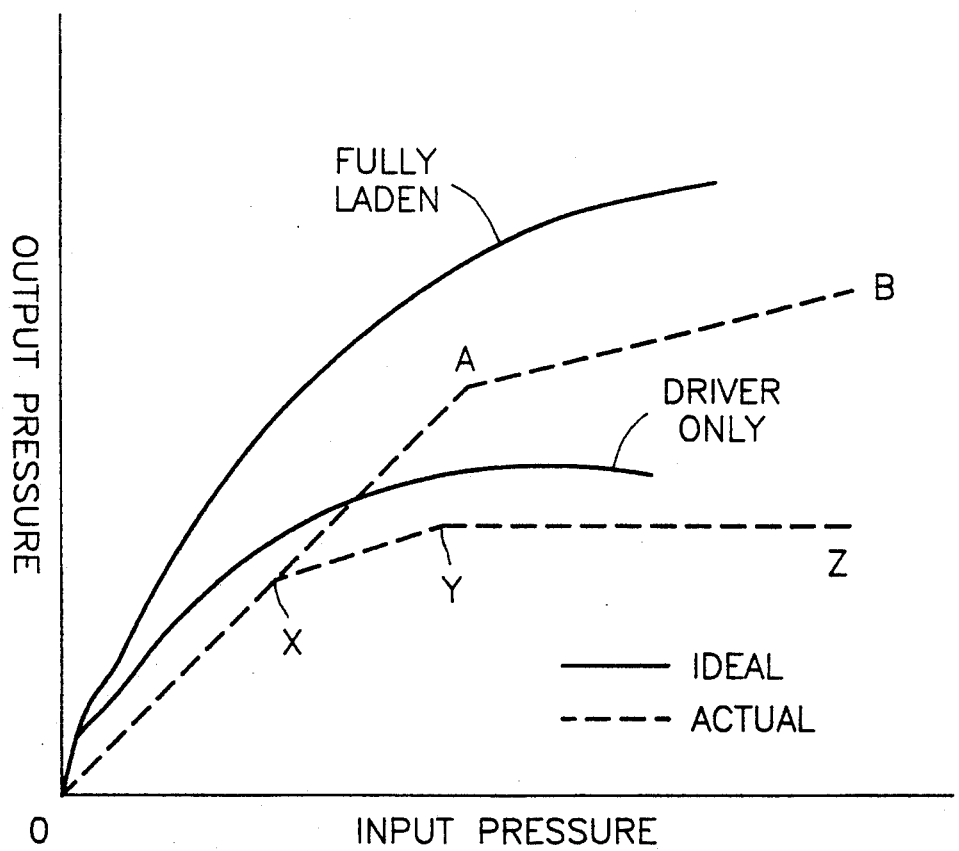
FIG. 3 is a graph showing the characteristics of the valve 2 of the invention.

If there is a further increase in pressure at inlet 21, this increased pressure, acting over the area of the annular zone $(A_2-A_1)$ will tend to move piston 6 back towards the left. The strength of spring assembly 29 which acts on plunger 28 is chosen so that the higher pressure in inlet chamber 4A acting on ball 7 over the area of seat 24 is sufficient to compress spring assembly 29 as piston 6 again moves to the left. In other words, once seat 24 has engaged ball 7, the ball and piston will move to the left as a unit if there is any further increase in inlet pressure, and spring assembly 29 will be insufficient to push the ball clear of the seat. Accordingly, once the piston is moved sufficiently far to the right for the seat to engage the ball in the drive only case (point X on FIG. 3), any further increase in inlet pressure will move the piston and ball together to the left to increase the outlet pressure at a rate lower than the rate of increase in inlet pressure. This will continue until point Y on FIG. 3, at which point the piston will again have engaged shoulder 27. Any further increase in inlet pressure will thereafter merely push ball 7 more firmly into engagement with seat 24, and there will be no corresponding rise in outlet pressure. Accordingly, the driver only characteristic OXYZ of FIG. 3 is produced.

In the fully laden case where the vehicle is fully occupied, i.e. by the driver and other occupants, or load, the deceleration produced by the pressure necessary to move piston 6 against the force of spring 9 will produce insufficient force on ball 7 to hold it stationary relative to valve body 20 as the piston moves, and movement of piston 6 to the right will be accompanied by corresponding rightward movement of ball 7. Only when the inlet pressure has risen to a level sufficient to roll ball 7 up the slope 18 or 18A (depending on the exact loading of the vehicle) will ball 7 be able to engage seat 24 to interrupt communication between inlet 21 and outlet 22. Accordingly, in the fully laden case the cut-in pressure of the valve will be increased as compared with the driver only case.

In the fully laden case, any increase in pressure at the inlet over and above the cut-in pressure will result in leftward movement of piston 6 and ball 7 as a unit to displace fluid to the rear brakes. The rise in pressure at the outlet will be less than the rise in pressure at the inlet as will be understood by those skilled in the art. Because of the relatively large amount of leftward displacement available under these conditions, it is most unlikely that piston 6 will engage shoulder 27, and accordingly there will be no upper limit on the pressure supplied to the rear brakes. Accordingly the valve will produce the characteristic OXAB of FIG. 3 in the fully laden case.

A plunger 30 is slidably mounted within a bore 31 provided in piston 6 and carries a cross pin 32 which is located in an over-sized hole 33 in the piston. Cross pin 32 projects beyond the piston so that after piston 6 has moved a predetermined amount cross pin 32 strikes an end face 34 of the valve body. Thereafter, further rightward movement of ball 7 which engages the end of plunger 30 is prevented, regardless of further rightward movement of piston 6, and regardless of the deceleration of the vehicle.

The effect of this arrangement is to provide a limit to the cut-in pressure, regardless of vehicle deceleration. Once the brake pressure has reached a value sufficient to move piston 6 by the amount of the initial clearance between cross pin 32 and end face 34 plus the amount of initial clearance between ball 7 and seat 24, seat 24 will engage ball 7, regardless of deceleration. This arrangement is particularly useful since it provides an upper limit of cut-in pressure to the rear brakes, regardless of the efficiency of the front brakes. Thus, if in the fully laden case the front brakes are producing significantly less retardation than normal, for example as a result of brake pad heating due to repeated use, a cut-in pressure will be reached even though the deceleration produced at the cut-in pressure is insufficient to move ball 7 up ramp 18, 18A. Accordingly, premature locking of the rear brakes is avoided.

Pressure reducing valve 3 comprises a valve set 11 formed by a valve seat 12 and a valve member 13. The valve seat 12 is formed on a piston 14 and the valve set 11 is effective to control communication between an inlet chamber 15 and an outlet chamber 16. The piston 14 has an area $A_1$ exposed to atmosphere via the passage 8 and an area $A_2$ exposed to the pressure prevailing in the outlet chamber 16. The piston 14 is acted upon by the spring 9 via a washer 17.

In use, pressure is supplied to the inlet chambers 4A,15 from suitable pressure sources, for example the respective chambers of a tandem master cylinder. Initially, the valve set 5 provides free communication between the chamber 4A and the chamber 4 and the valve set 11 provides free communication between the chamber 15 and the chamber 16. In general, the brake pressure supplied from the respective outlets of the tandem master cylinder will be substantially equal, and accordingly substantially equal pressures will be present in the outlet chambers 4,16 to be communicated to respective rear brake actuators.

When the brakes are applied the valve 2 operates in the manner described in our co-pending application referred to above. In general, in the driver only case the piston 6 will begin to move against the force of spring 9 when the pressure in the associated brake circuit acting over the area $A_1$ is able to overcome the force of the spring 9. In the driver only case, this brake pressure would in general be sufficient to provide a deceleration sufficient to maintain the ball 7 in its illustrated position relative to the valve body with the result that after a small travel the valve set 5 will close to interrupt communication between the chambers 4a and 4. At the same time, the pressure in chambers 15 and 16 acting over the area $A_1$ will be able to move the piston 14 against the force of the spring 9 to close the valve set 11 and interrupt communication between the chambers 15 and 16. The movement of the pistons 6,14 necessary to close the associated valve sets will be small, and accordingly there will be substantially no change in the force produced on the pistons by the spring 9. At pressures above cut-in pressure the pressure $Pr_2$ in the outlet chamber 4 of valve 2 will be related to the pressure $Pf_2$ in the inlet chamber 4A by the formula:

$$Pr_2 \cdot A_2 = Pf_2 (A_2 - A_1) + S \qquad (i)$$

where S is the force of the spring 9. In the case of the valve 3 the pressure $Pr_3$ at the outlet, at pressures above cut-in pressure will be related to the pressure $Pf_3$ at the inlet o±the valve 3 by the formula:

$$Pr_3 \cdot A_2 = Pf_3 (A_2 - A_1) + S \qquad (ii)$$

It will be immediately apparent that if $Pf_2$ is substantially equal to $Pf_3$ at any particular pressure, then $Pr_2$ will substantially equal $Pr_3$.

If the vehicle is laden then the brake pressure subsisting in the system at the moment when the piston 6 begins to move against the force of spring 9 will be insufficient to hold the ball 7 in its illustrated position relative to the valve body, and accordingly the piston 6 will begin to move to the right as viewed in the drawing, without resulting in closure of the valve set 5. This movement of the piston will compress the spring 9 and increase the force which the spring 9 applies to both the piston 6 and the piston 14. Since the pressures at both the inlet chambers 4A and 15 will be substantially equal, when the piston 6 begins to move against the force of the spring 9, the piston 14 may begin to move against the force of the spring. This would result in momentary closure of the valve set 11. However, if there is then a further increase in inlet pressure, but that increase in inlet pressure is insufficient to roll the ball 7 back up the ramp surfaces 18,18A, the resultant movement of the piston 6 to the right will increase the compression of the spring 9 and increase the load on the piston 14. This, combined with the increase in inlet pressure at the inlet chamber 15 acting over the annular area $(A_2 - A_1)$ will cause the piston 14 to move to the right, thereby opening the valve 11 and permitting the pressure at the outlet chamber 16 to rise to the pressure at the inlet chamber 15. Accordingly, the outlet pressures $Pr_2$ and $Pr_3$ will remain equal until the valve set 5 is closed as a result of adequate deceleration of the vehicle.

As soon as the valve set 5 is closed any further increase in inlet pressure $Pf_2$ will result in movement of the piston 6 to the left as described in more detail in WO 90/13462 referred to above. Such movement of the piston will reduce the compression of the spring 9, thereby reducing the force which the spring 9 applies to the piston 14. As a result, the valves 2 and 3 will operate in accordance with the formula (i) and (ii) given above and the outlet pressures $Pr_2$ and $Pr_3$ will remain equal.

In the event of a failure in the circuit served by the valve 2, the valve 3 will operate to produce a cut-in pressure corresponding to the driver only case. Above cut-in pressure the rear brake pressure $Pr_3$ will be metered in the usual way. Should a failure occur within the circuit served by the valve 3 the valve 2 will operate to produce a cut-in pressure determined by deceleration of the vehicle. This cut-in pressure will obviously be higher than in the case when both brake circuits are working since the deceleration produced by a single circuit will be less than that produced at a corresponding pressure by both circuits.

Figure 2:
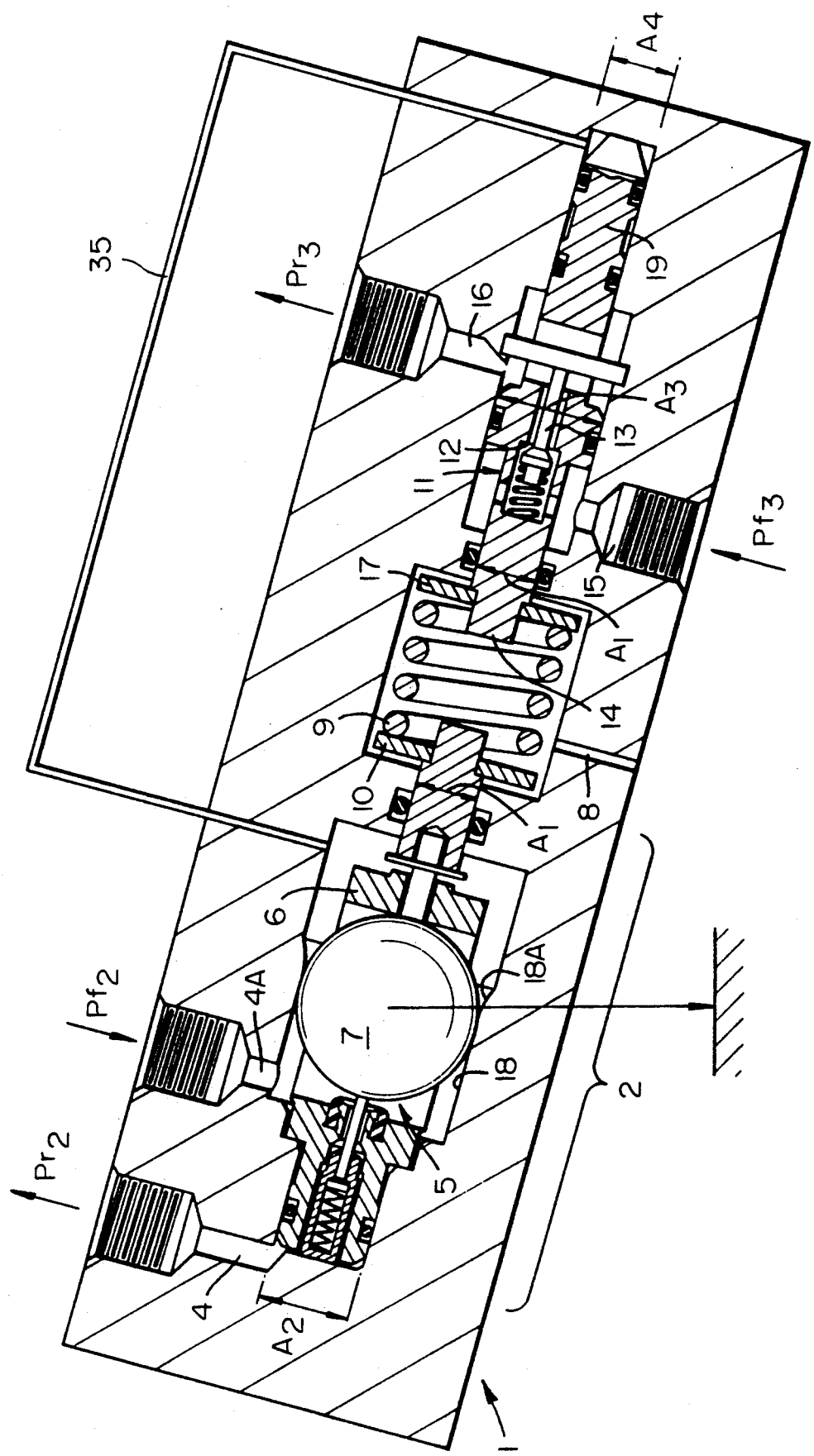

A second embodiment of the invention is illustrated in FIG. 2. This embodiment corresponds to that of FIG. 1 except that the head of the piston 14 is of an increased area $A_3$, and the piston 14 is furnished with an extension 19 of area $A_4$ such that $A_3 - A_4$ is equal to the area $A_2$ of the piston 6. Area $A_4$ is exposed by line 35 to the pressure prevailing within the inlet chamber 4A of the valve 2. With this arrangement, if the circuit associated with the valve 2 fails, the force produced by pressure $Pf_2$ acting over area $A_4$ of the piston extension is no longer present, and accordingly a higher pressure will be required in the brake circuit served by the valve 3 in order to move the piston 14 against the force of the spring 9. Thus, upon failure of the circuit associated with the valve 2, the cut-in pressure of the other brake circuit is increased.

I claim:

1. A brake pressure reducing valve assembly for a vehicle comprising:

a valve body;

first and second normally open valve means for controlling communication between respective associated inlet and outlet chambers;

said first valve means comprising a first inlet chamber within said valve body connectable to a source of brake actuating fluid, a first outlet chamber within said valve body and connectable to a brake actuator, a first brake pressure responsive piston slidably mounted in said valve body separating said first inlet chamber from said first outlet chamber, a first valve seat on said first piston in said first inlet chamber, and a deceleration responsive first valve member movably mounted in said first inlet chamber and engageable with said first valve seat for maintaining said first valve means normally open when the deceleration of the vehicle is below a first threshold value and for engaging said first valve seat for closing said first valve means when the deceleration of the vehicle reaches a second threshold value, said first valve member being movable in said valve body in response to pressure in said first inlet chamber produced by said source of brake actuating fluid; and said second valve means comprising a second inlet chamber within said valve body and connectable to a source of brake actuating fluid, a second outlet chamber in said body and connectable to a brake actuator, a second brake pressure responsive piston slidably movable in said valve body separating said second inlet chamber from said second outlet chamber and movable in response to pressure in said second inlet chamber produced by said source of brake actuating fluid connected to said second inlet chamber, a second valve member between said second inlet and outlet chambers, a second valve seat on said second piston engageable with said second valve member for closing said normally open second valve means in the engaged positions, compression spring means in said valve body and operatively mounted between said first and second pistons for urging said pistons in a direction away from each other, so that said pistons are moved towards each other against the force of said compression spring means to affect closing of said first and second valve means, the force required to move said second piston towards said first piston against the force of said compression spring means in any position of said first piston is determined by the position of said first piston, and when said first piston moves in response to brake pressure in said first inlet chamber exceeding a predetermined value and the deceleration of the vehicle is below said first threshold value said first valve member and said first valve seat move with said first piston to maintain separation between said first valve member and said first valve seat until deceleration of the vehicle reaches said second threshold valve.

2. A brake pressure reducing valve assembly as claimed in claim 1 wherein:
said first and second valve means are substantially aligned in said valve body;
a vented chamber is provided in said valve body between said first and second valve means; and
said compression spring means is disposed within said vented chamber.

3. A brake pressure reducing valve assembly as claimed in claim 2 wherein:
said first and second pistons have portions thereof extending into said vented chamber; and
said portions of said pistons each have an equal effective area exposed to said vented chamber.

4. A brake pressure reducing valve assembly as claimed in claim 3 and further comprising:
a second equal effective area on each of said first and second pistons exposed to said first and second outlet chambers, respectively.

5. A brake pressure reducing valve assembly as claimed in claim 1 and further comprising:
an auxiliary effective area on said second piston; and
means for applying the pressure in said first inlet chamber to said auxiliary effective area so that pressure in said first inlet chamber urges said second piston in the direction toward closing of said second valve means.

6. A brake pressure reducing valve assembly as claimed in claim 1 and further comprising:
means for preventing engagement of said first valve seat with said first valve member in the absence of fluid pressure in said first inlet chamber; and wherein
fluid pressure in said first inlet chamber exceeding said predetermined value moves said first piston to a position wherein said first valve seat is engageable with said first valve member.

7. A brake pressure reducing valve assembly as claimed in claim 6 wherein said means for preventing engagement of said first valve seat with said first valve member comprises biasing means between said valve body and said first valve member.

8. A brake pressure reducing valve assembly as claimed in claim 6 wherein said deceleration responsive first valve member comprises a member having physical characteristics and an inertia that resists movement thereof so that said first valve member is engaged by said first valve seat when said first piston moves very rapidly irrespective of the deceleration of the vehicle.

9. A brake pressure reducing valve assembly as claimed in claim 6 wherein said deceleration responsive first valve member comprises means for maintaining the position of said first valve member fixed relative to said valve body as said first piston is moved by pressure in said first inlet chamber at said predetermined value when deceleration of the vehicle produced by said pressure at said predetermined value is at least equal to deceleration at a value whereby said first valve member is engageable with said first valve seat.

10. A brake pressure reducing valve assembly as claimed in claim 6 wherein said deceleration responsive first valve member comprises means for permitting said first valve member to move with said first piston as said first piston is moved by said predetermined value when deceleration of the vehicle produced by said pressure is less than deceleration at said first threshold value whereby said first valve member remains spaced from said first valve seat.

11. A brake pressure reducing valve assembly as claimed in claim 1 and further comprising:
a cage-like portion on said first piston;
a first sloping surface on said valve body; and
said deceleration responsive first valve member comprises a member having a substantially round exterior surface movably disposed within said cage-like portion and engaging said first sloping surface for movement therealong.

12. A brake pressure reducing valve assembly as claimed in claim 11 wherein:
said first piston is slidable in said valve body along an axis of movement;
a second sloping surface is provided on said valve body continuous with said first sloping surface and diverging from said axis of movement in the direction towards said second valve means, said first valve member being engageable with said sloping surfaces by rolling contact therewith, and
when said first valve member rolls toward said second valve means a predetermined distance it engages said second sloping surface which is steeper than said first sloping surface with which said first valve member is engaged when there is no fluid pressure within said first inlet chamber.

13. A brake pressure reducing valve assembly as claimed in claim 1 wherein said first valve member comprises a member having a rounded exterior surface.

14. A brake pressure reducing valve assembly as claimed in claim 1 wherein said first and second pistons have predetermined sizes relative to each other and are positioned in said valve body relative to each other so that when said first and second valve means are closed, an increase in pressure in said first and second inlet chambers produces a smaller increase in pressure in said first and second outlet chambers.

* * * * *